United States Patent [19]

Clark et al.

[11] Patent Number: 4,578,101
[45] Date of Patent: Mar. 25, 1986

[54] METHOD FOR STRETCHING A GLASS ROD

[75] Inventors: Harold R. Clark, Plainfield Township, Union County; David A. Nicol, Hamilton Township, Mercer County, both of N.J.

[73] Assignee: AT&T Technologies, Inc., Berkeley Heights, N.J.

[21] Appl. No.: 654,600

[22] Filed: Sep. 26, 1984

[51] Int. Cl.[4] .............................................. C03B 23/04
[52] U.S. Cl. ........................................ 65/109; 65/108; 65/283
[58] Field of Search ................. 65/108, 109, 271, 283, 65/120, 278, 279

[56] References Cited

U.S. PATENT DOCUMENTS

| | | | |
|---|---|---|---|
| 2,282,993 | 5/1942 | Dichter | 65/271 |
| 3,293,019 | 12/1966 | Nitsche et al. | 65/110 |
| 3,556,758 | 1/1971 | Andrews | 65/283 X |
| 3,652,248 | 3/1972 | Loxley | 65/108 |
| 3,852,054 | 12/1974 | Dichter | 65/109 |
| 4,247,319 | 1/1981 | Hofmann | 65/109 |
| 4,477,273 | 10/1984 | Lynch | 65/109 X |

*Primary Examiner*—Kenneth M. Schor
*Attorney, Agent, or Firm*—R. B. Levy

[57] ABSTRACT

Control over the diameter variations in a glass rod (10) during the stretching thereof is accomplished by cooling the rod after heating and initial neck down of a portion (22) thereof. After cooling, the rod (10) is reheated, at a lower temperature sufficient to reflow the glass in the necked-down portion (22) thereof, and is then stretched to the desired final diameter. Heating the rod (10) at a lower temperature during stretching increases the viscosity thereof which reduces its response to the stretching conditions, thereby affording better control over diameter fluctuations.

3 Claims, 4 Drawing Figures

METHOD FOR STRETCHING A GLASS ROD

TECHNICAL FIELD

This invention relates generally to a method for stretching a glass rod which affords increased control over variations in the diameter thereof.

BACKGROUND OF THE INVENTION

Lightguide fiber, which is commonly being used in many communication applications, is manufactured by drawing out a lightguide preform, comprised of a refractive core surrounded by glass cladding. Lightguide preforms are commonly fabricated by one of several well known chemical vapor deposition processes. One such process is the Vapor Phase Axial Deposition (VAD) technique wherein a vertically aligned rod known as a bait rod is rotated about its axis with the lower end thereof within the combustion zone of a gas torch. Precursor gases, such as $SiCl_4$ and $GeCl_4$, are flowed through the torch into the combustion zone so that submicron-sized glass particles, formed by the reaction product of the gases, are deposited upon the end of the bait rod. The bait rod is slowly withdrawn as the deposition process continues, causing a glass soot boule to be grown endwise thereon. The soot boule derives its name from the fact that collection glass particles comprising the boule appear as soot particles.

After the soot boule is grown in the above-described manner, the boule is consolidated, typically by sintering. Following consolidation, the boule is then cladded by insertion into a glass tube which is then collapsed thereabout to form the preform. In certain instances, the boule is initially cladded by deposition of pure silica glass thereon prior to consolidation and insertion into the silica glass tube.

To obtain lightguide fiber having the desired transmission characteristics and mechanical flexibility, the mass ratio of the core to the cladding of the preform from which the fiber is drawn must be within a narrow range of values. Typically, boules grown by the VAD process are too large in their original state to fabricate a preform having the desired core-to-cladding mass ratio. Rather, the boule is usually stretched before insertion into the silica tube to reduce its mass per unit length. Stretching is accomplished on a glass lathe whose construction is well known in the art. The boule is mounted between the headstock and tailstock of the lathe for cojoint rotation therewith. As the boule rotates, a torch moves underneath the boule along the axis thereof at a constant rate towards the headstock. Simultaneously with the movement of the torch, the tailstock moves away from the headstock, causing the boule to be stretched to reduce the diameter thereof.

In order for the stretched boule to reach its equilibrium shape, the heated glass deforms or flows in response to the tensile force applied during stretching, causing fluctuations in the diameter of the boule. The diameter variations occur because the stretched diameter of the boule almost always overshoots the equilibrium shape. If an undersized portion of glass leaves the zone heated by the torch, conservation of mass requires that an oversized portion follow it, resulting in variations in the boule shape. Diameter fluctuations in the stretched boule causes variations in the core-to-cladding mass ratio of the resultant preform which result in degradation of the transmission characteristics of the drawn fiber that are undesirable. Although efforts are made during stretching to reduce the diameter variations, fluctuations of up to 30% are not uncommon especially at the inception of stretching. While the diameter fluctuations do ultimately dampen out, much of the boule is drawn before steady state conditions are reached.

Accordingly, there is a need for a method for stretching a glass rod, such as a lightguide boule, which affords increased control over diameter variations.

SUMMARY OF THE INVENTION

The aforementioned disadvantages are overcome by the method of the present invention. To accomplish stretching of a glass rod while affording increased control over fluctuations in the diameter thereof, the rod is initially heated to a temperature high enough for reflow thereof. The heated rod is then stretched to neck down at least a portion thereof to approximately the desired final diameter. The temperature at which the rod is being heated is then reduced to a level sufficient for reflow of the necked-down portion thereof. Thereafter, the rod is stretched, while being heated at the lower temperature, to draw out the portion thereof not previously necked down to the desired final diameter.

Heating the rod at a lower temperature during stretching increases the viscosity thereof. Increasing the viscosity of the rod dampens its response to the stretching conditions and thus affords greater control over diameter variations.

DETAILED DESCRIPTION

Figure 1:
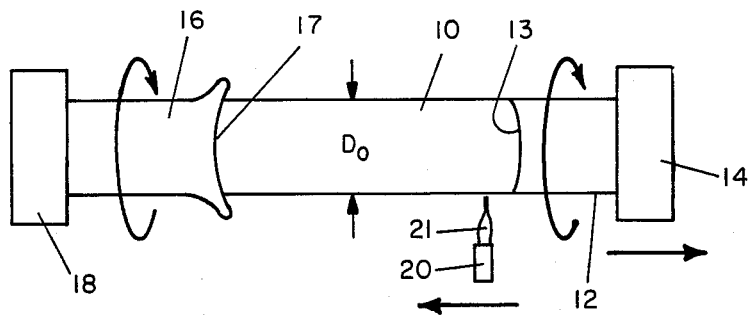
FIG. 1 is a schematic illustration depicting the initial step of heating a glass rod on a glass lathe to accomplish stretching in accordance with the method of the present invention.

FIG. 1 illustrates a glass boule 10 of the type which is grown, that is, fabricated by chemical vapor axial deposition (VAD) of submicron-sized doped glass particles on the end of a quartz bait rod 12. The boule 10 can be fabricated by other chemical vapor deposition techniques in addition to the VAD process. For purposes of illustration, a very abrupt interface 13 between the boule 10 and the rod 12 has been depicted. In practice, the interface 13 is much more gradual. Further, while the boule 10 and the rod 12 are shown as having approximately the same diameter $D_o$, typically 20 mm, this is not always the case. The diameter of the bait rod 12 may, in certain instances, be smaller than that of the boule 10 grown thereon.

In the past, stretching of the boule 10 to achieve a smaller diameter therefor and to reduce the mass per unit length thereof has been accomplished by clamping the bait rod 12 in the tailstock 14 of a well known glass lathe. A short length of quartz rod 16 is attached at one end thereof by fusing it to the end of the boule 10 opposite the rod 12, forming a joint 17 therebetween. The opposite end of the rod 16 is clamped to the headstock 18 of the lathe so that the rod 12, the boule 10 and the rod 16 rotate cojointly therewith. Combustible gases, such as hydrogen and oxygen are flowed through a torch 20 at rates of 28–32 liters per minute (lpm) and 14–16 lpm, respectively, so that upon gas ignition, a flame 21 is produced which is hot enough to reflow the boule 10. The torch 20 is moved beneath the boule 10 along the axis thereof towards the headstock 18 at a speed of typically 0.05 mm/sec., and the tailstock 14 is moved in an opposite direction at a speed of typically 0.2 mm/sec., causing the boule 10 to be stretched out.

As the boule 10 is being stretched out, fluctuations in the diameter thereof are likely to occur as a result of the natural response of the glass to the stretching conditions. Fluctuations in the diameter of the boule 10 during stretching thereof result in variations in the core-to-cladding ratio of the preform produced from the boule 10, and are therefore undesirable. Although efforts are made at reducing if not avoiding diameter fluctuations during stretching of the boule 10, fluctuations of as much as 30% are not uncommon, particularly at the beginning of stretching. While these diameter fluctuations eventually dampen out, much of the boule 10 is often drawn before steady state conditions are established.

A new stretching method has been developed to afford greater control over fluctuations in the desired diameter of the boule 10. The boule 10 is mounted between the tailstock 14 and the headstock 18 of the glass lathe in the usual manner discussed above with respect to FIG. 1. The hydrogen flow rate through the torch 20 is set at 28–32 lpm and the oxygen flow rate is set at 14–16 lpm as before, so that upon gas ignition, the resultant flame 21 is hot enough to reflow the glass of the boule 10. Although hydrogen and oxygen are commonly chosen as the combustible gases for torch 20, other combustible gas combinations such as carbon monoxide (CO) and oxygen could be used instead.

Figure 2:
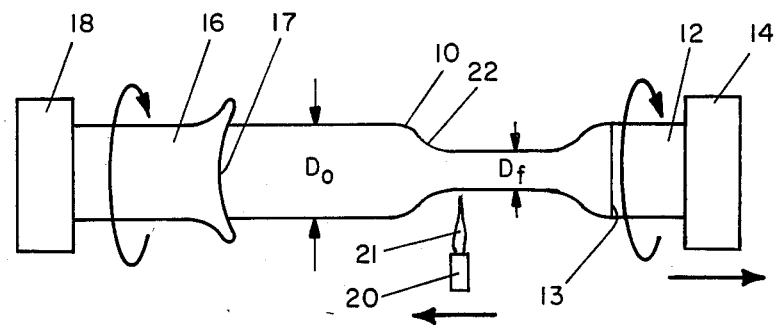
FIG. 2 is a schematic illustration depicting the step of necking down at least a portion of the rod to approximately the desired final diameter.

Turning now to FIG. 2, the torch 20 is moved at the rate approximately 0.05 mm/sec. beneath the boule 10 along the axis thereof towards the headstock 18. As the boule 10 is being heated, the tailstock 14 is moved away from the headstock 18 at the speed of approximately 0.2 mm/sec. to stretch the boule 10 in the usual manner. Stretching of the boule 10, by moving the tailstock 14 away from the headstock 18, continues until at least a portion or region 22 of the boule 10 is necked down, that is to say, the diameter thereof is reduced to, approximately the desired final diameter $D_f$. Although the step of neck down of the boule 10 is usually accomplished by moving the torch 20 and the tailstock 14 in opposite directions, the torch 20 can remain stationary. However, moving the torch 20 in a direction opposite to the movement of the tailstock 14 is desirable in order to avoid having a very narrow or abrupt necked-down region 22 on the boule 10.

Figure 3:
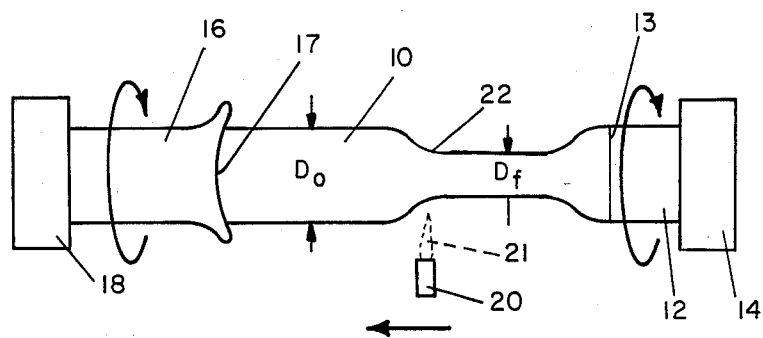
FIG. 3 is a schematic illustration depicting the step of cooling the rod.

Once the necked-down region 22 on the boule 10 has been created, the torch 20 is extinguished, (as illustrated in FIG. 3 by the flame 21 of the torch 20 depicted in phantom) by interrupting the flow of combustible gases thereto, thereby allowing the boule 10 to cool. Rather than extinguishing the torch 20 completely, cooling of the boule 10, so that the glass is much more viscous, could be accomplished by reducing the flow rate of the oxygen into the torch. While the boule 10 is cooling, the torch 20 is moved a short distance, typically 1–2 millimeters, towards the headstock 18 from its previous position so as to be further from the interface 13 between the boule 10 and the rod 12.

Figure 4:
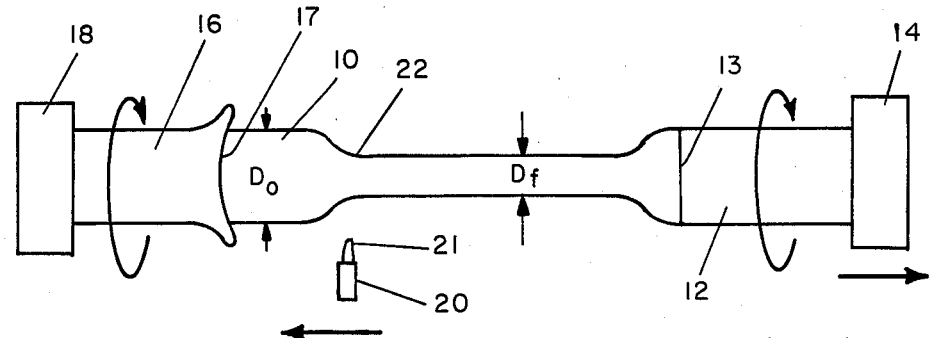
FIG. 4 is a schematic illustration depicting the step of reheating and stretching of the rod to draw out the portion thereof not previously necked down, to the desired final diameter.

Turning now to FIG. 4, after the boule 10 has cooled, the torch 20 is rekindled but at lower hydrogen flow and oxygen flow rates. Instead of feeding the torch 20 with hydrogen and oxygen at rates of 28–32 lpm and 14–16 lpm, respectively, as before, the flow rates are reduced to approximately 17–18 lpm and 8.5–9 lpm, respectively. With such low combustible gas flows through the torch 20, the resultant flame 21 would not be hot enough to reflow the glass of that portion of the boule 10 that has yet to be necked down if the flame 21 were applied directly thereto. However, the flame 21 resulting from the lower combustible gas flow rates is hot enough to reflow the glass within the necked-down region 22 of the boule 10 because of its reduced mass.

The torch 20 moves towards the headstock 18 as the tailstock 14 moves in the opposite direction to draw out the boule 10, causing the necked-down region 22 to shift continuously leftwardly as shown in FIG. 4. Stretching in this fashion continues until substantially all of the boule 10 is drawn out to the desired diameter $D_f$.

The foregoing method of stretching the boule 10 affords several advantages as compared to the conventional stretching method. The necked-down region 22 on the boule 10, created by heating, stretching and then cooling thereof, can be reheated and stretched at a lower temperature owing to its reduced mass. Reducing the temperature at which necked-down region 22 on the boule 10 is heated during stretching increases the viscosity thereof which dampens the response of the glass to the stretching conditions, thereby affording greater control over diameter variations. Further, after stretching of boule 10 to create the necked-down region 22, any deviations in the diameter thereof during stretching to the final necked-down shape will likely be smaller as compared to those deviations which result from necking down the boule 10 from its original shape.

Reducing temperature at which the boule 10 is heated during stretching to dampen the response thereof to the tensile forces can be achieved in a manner other than by extinguishing the torch 20 and then rekindling the torch at a lower combustible gas flow rate. Instead, the flow of combustible gases into the torch 20 can be modulated during stretching of the boule 10 to achieve a continuous reduction of the flame 21 so that once the necked-down region 22 is created, the temperature of the flame will be sufficient to reflow the glass thereof.

While the above-described method of stretching has been described as being practiced on a glass lathe, it could also be practiced with a furnace. Further, any type of glass rod can be stretched in accordance with the instant method not necessarily the boule 10.

It is to be understood that the method described herein is merely illustrative of the principles of the present invention. Various modifications and changes may be made thereto by persons skilled in the art which will embody the principles of the invention and fall within the spirit and scope thereof.

What is claimed is:

1. A method for stretching a solid glass rod comprising the steps of:

reflowing a portion of the rod with a heat source which creates a zone of heat about the rod;

stretching the reflowed portion of the rod to establish a region on the rod where the diameter tapers from the original diameter of the rod to a smaller desired diameter;

reducing the temperature of the heat source to a level sufficient to maintain the reflow of the glass within the tapered diameter region on the rod at a reduced temperature;

progressively reflowing, at said reduced temperature, the portion of the rod not yet reflowed by imparting a relative motion between the heat source and the rod such that the zone of heat moves axially along the rod towards the original diameter portion of the rod; and stretching the rod as it is progressively reflowed to reduce the diameter of that portion of the rod not previously reduced to the smaller desired diameter.

2. The method according to claim 1 wherein the step of the reflowing a portion of the rod comprises the substeps of:
 (a) directing a mixture of combustible gases into a torch at a first flow rate;
 (b) igniting the torch;
 (c) moving the torch proximate to the rod a distance along the axis thereof in a single direction; and
 (d) rotating the rod about its axis as the torch is moved therealong.

3. The method according to claim 2 wherein the step of reducing the temperature of the heat source includes the step of decreasing the flow rate of combustible gases into the torch to a second rate than said first rate.

* * * * *